United States Patent [19]

Roze et al.

[11] Patent Number: 5,030,480
[45] Date of Patent: Jul. 9, 1991

[54] PROCESS FOR COATING A MAGNETIC DISK

[75] Inventors: Danielle Roze, Villiers Saint-Frederic; Pierre Bernstein, Neauphle-Le-Chateau, both of France

[73] Assignee: Bull S.A., Paris, France

[21] Appl. No.: 505,726

[22] Filed: Apr. 6, 1990

[30] Foreign Application Priority Data

Apr. 13, 1989 [FR] France .................. 89 04881

[51] Int. Cl.$^5$ .................................. H01F 10/02
[52] U.S. Cl. ........................ 427/129; 427/130; 427/131; 427/335; 427/348; 427/352; 427/355; 427/385.5; 427/425; 428/64; 428/695; 428/900
[58] Field of Search ............... 427/127–132, 427/48, 335, 348, 352, 355, 385.5, 425; 428/900, 695, 64

[56] References Cited

FOREIGN PATENT DOCUMENTS 0174024 3/1986 European Pat. Off.
0176636 4/1986 European Pat. Off.

OTHER PUBLICATIONS

"Impressionen aus einer Plattenspeicherfertigung", Elektronik, vol. 34, No. 22, Oct. 1985, pp. 131-135, Munich, Germany.

Primary Examiner—Bernard Pianalto
Attorney, Agent, or Firm—Weingarten, Schurgin, Gagnebin & Hayes

[57] ABSTRACT

A process for depositing a lubricating coating on the silicon oxide protective layer of a magnetic disk, wherein after having cleaned the disk, the sequence for coating the surface of the disk includes the steps of: setting the magnetic disk into rotation; spraying onto the protective layer of the disk, in the direction of rotation, a lubricant containing carrier gases, solvents, and active oxyhydrocarbon monomeric elements that are polymerized and then adsorbed to the protective layer; spraying a solvent on the disk in the direction of rotation; and wiping the disk. The invention is applicable to a variety of disk structures, including magnetooptical disks.

7 Claims, 3 Drawing Sheets

PROCESS FOR COATING A MAGNETIC DISK

FIELD OF THE INVENTION

This invention relates to processes for coating the surface of a magnetic disk and to coated magnetic disks, and particularly to a process for depositing a lubricating layer, and to a magnetic disk that results from this process.

BACKGROUND OF THE INVENTION

In a magnetooptical disk memory system data is written to a magnetic disk by means of a magnetic write transducer, for example, and read by an optoelectronic device that includes a more or less complicated optical focusing device in cooperation with a photoelectronic transducer and a circuit for amplifying signals provided by the transducer. Given the rapid rate of technological evolution, there is a tendency to use such memory systems because they make it possible to obtain radial densities on the order of several thousand tracks per centimeter, and longitudinal densities on the order of 10,000 information bits per centimeter.

The operation of such systems is based on a magnetooptical effect which involves the interaction of linearly polarized light with the magnetic state of a region of the recording layer of a magnetooptical disk. French Patent 2,514,913, corresponding to U.S. Pat. No. 4,510,544, and filed by Compagnie Internationale pour l'Informatique CII HONEYWELL BULL, provides more complete details on the magnetooptical effect. French Patent Application 87.13738, corresponding to U.S. patent application Ser. No. 253,041, filed on Oct. 5, 1987 by Société BULL S. A., and entitled "Controlled Device for Optical Reading and Magnetic Writing on Data Storage Media," and French Patent Application 87.13739, corresponding to U.S. patent application Ser. No. 253,038, filed on Oct. 5, 1987 by Société BULL S. A., and entitled "Device for Optical Reading and Magnetic Writing on a Data Storage Medium", describe devices for optical reading and magnetic writing of data on a magnetooptical disk, comprising a magnetic transducer for writing the data on the medium, the transducer being mounted on a skate for flying above the medium, and an optoelectronic device, most of which is mounted on the skate. The skate flies above the magnetooptical disk at a distance of several tenths of a micron. Magnetooptical disks are now well known. One such disk is described in French Patent Application 87.18355, corresponding U.S. patent application Ser. No. 291,142, filed on Dec. 30, 1987 by Société BULL S. A., and entitled "Magnetooptical Recording Medium Resistant to Corrosion in a Humid Atmosphere." A magnetooptical disk of this kind includes a substrate upon which a first dielectric layer (for example, composed of alumina or aluminum nitride) is deposited, upon which a magnetooptical recording layer is then deposited. The recording layer is composed of an alloy including one or more metals in the first transition series (Fe, Co, Cr, Ni, Mn) and one or more metals in the heavy rare earth group, such as terbium, gadolinium, or dysprosium. A second dielectric layer is deposited on the magnetooptical recording layer. This layer is then covered with a layer of an oxide of silicon (either the monoxide or the dioxide), which protects the second dielectric layer and the magnetooptioal recording layer from mechanical impact and corrosion, especially in damp atmospheres.

It is extremely difficult for a skate such as the one described above to fly over a magnetooptical disk of this kind. To overcome this difficulty, it is first necessary to deposit a lubricating layer thereon. Lubricating layers of this kind have been used for a long time to coat classical magnetic disks; this type of disk is written to and read from by means of magnetic recording and reading transducers. They are usually composed of silicone or lubricating layers that contain carbon. Layers of this kind have been found to be unusable for magnetooptical disks coated with silicon oxide because the silicone lubricating layers do not allow a skate to fly close enough to the surface of the disk, and furthermore, layers that contain carbon are not transparent to light and therefore do not allow optical reading of information stored on the magnetooptical disk.

Products for coating metallic items can also be used in conjunction with magnetooptical disks that include a protective layer of silicon oxide to provide protection from oxidation as well as lubrication. This type of coating allows a skate, including a magnetic write transducer and an optoelectronic read device, to fly over the surface of a disk. This type of product is sold in the form of an aerosol bomb. It consists of a complex mixture of a Freon-based carrier gas, a mixture of solvents of the toluene and polychloroethylene type, and monomeric oxyhydrocarbon elements. It will be referred to hereinbelow by the term "lubricant." It is manufactured and sold, for example, by Dow Corning GmbH of Munich, in the Federal Republic of Germany, under the commercial name Molykote (a registered trademark of Dow Corning Corporation), and is one of a class of "metal protectors."

SUMMARY OF THE INVENTION

According to the invention, a process is provided for depositing a layer on the surface of a magnetic disk, wherein the layer allows a read/write head to fly close to the surface of the disk. The magnetic disk includes a substrate upon which a magnetic recording layer is deposited, the recording layer being covered with a protective silicon oxide layer to protect the recording layer against impacts and corrosion. The process of the invention includes the steps of: cleaning the disk to remove dust; placing the disk into rotation; spraying the disk, in its direction of rotation, with a lubricant that includes a volatile part consisting of carrier gases and solvents, and oxyhydrocarbon monomeric elements which are polymerized by the evaporation of the solvents and adsorbed by the disk's protective layer; spraying a solvent onto the disk in the disk's direction of rotation to eliminate active molecules that are not interacting with its surface and any carrier gas molecules that may have been adsorbed by the protective layer; wiping the disk to substantially eliminate crystallites of the polymer from its surface; and covering the disk with a two-dimensional homogeneous monomolecular layer of hydrocarbon molecules that adsorb to the protective layer via a limited number of carbonyl groups that interact with the surface.

The invention also relates to a magnetic disk that includes a substrate upon which a magnetic recording layer is deposited, further coated with a corrosion and impact resistant layer, further including a surface layer that allows a read/write head to fly close to the disk, the surface layer consisting of a two-dimensional monomolecular layer of hydrocarbon molecules adsorbed to the protective layer by means of a number of carbonyl groups that interact with the corrosion and impact resistant layer.

DESCRIPTION OF THE DRAWINGS

The invention will be more fully understood from the following detailed description, in conjunction with the accompanying drawings, in which.

DETAILED DESCRIPTION OF THE INVENTION

Figure 1:
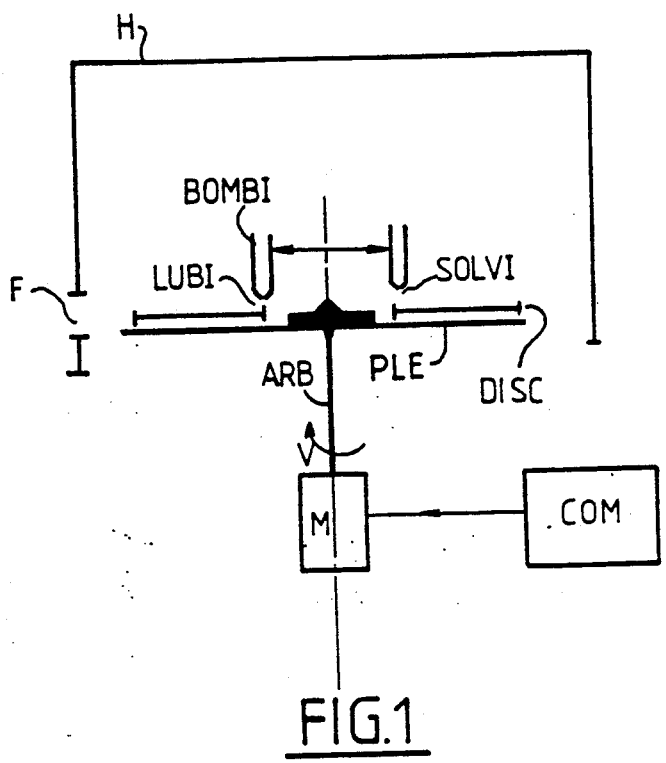
FIG. 1 is a schematic diagram of an apparatus for depositing a lubricating layer according to the process of the invention.

With reference to FIG. 1, an apparatus for practicing the process of the invention includes a plexiglas hood H in the form of a cylinder with a circular base. The cylinder is provided with a circular opening F of a diameter large enough to insert a magnetooptical disk DISC that is approximately 26 centimeters in diameter. The disk is introduced manually and then placed on drive plate PLE, which is itself integral with the shaft ARB of an electric motor M. This electric motor M is controlled by an electronic control device COM which makes it possible to vary the rotational speed V of the motor from 0 to 3700 rpm, for example. The disk is attached to the drive plate PLE by a screw, for example, (not shown to simplify FIG. 1) which provides perfect manual locking.

It is clear that both the drive motor M and its control device COM, as well as the motor shaft ARB and the drive plate PLE of the disk, are of a type which is in current use in magnetic disk memories which are typically found on the market.

Figure 2:
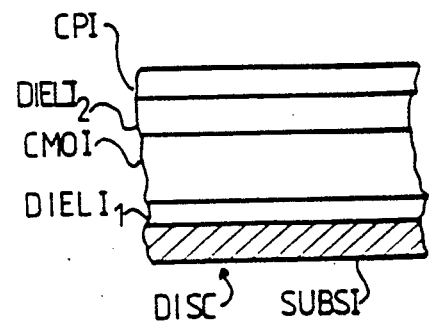
FIG. 2 is a cross sectional view of a magnetooptical disk which receives a deposition of a lubricating layer according the process of the invention.

The magnetooptical disk DISC shown in FIG. 2 is identical to that described in French Patent Application 87.18355, mentioned above, and includes a substrate SUBSI upon which a first dielectric layer $DIELI_1$ is deposited (for example made of aluminum nitride AlN). On this first dielectric layer $DIELI_1$, the magnetooptical layer CMOI is deposited, the layer being made of, for example, an alloy of iron-terbium Fe-Tb, or iron-terbium-gadolinium Fe-Tb-Gd, or iron-terbium-gadolinium-cobalt Fe-Tb-Gd-Co. A second dielectric layer $DIELI_2$ is deposited on this magnetooptical layer CMOI and a protective layer of silicon oxide, namely CPI, is thereafter deposited on the second dielectric layer. The thicknesses of these different layers are shown in the French patent application mentioned above.

Figure 3A:
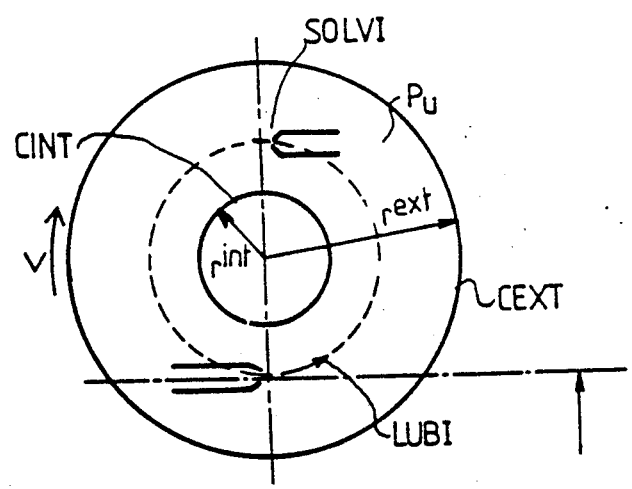
FIGS. 3a and 3b are top and side views, respectively, that illustrate the steps of spraying a lubricant and then spraying a solvent onto the magnetooptical disk of FIG. 2.
Figure 3B:
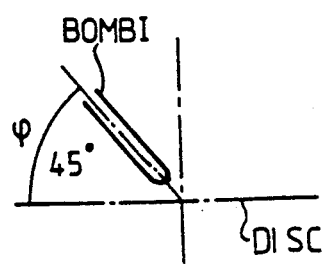
Figure 4:
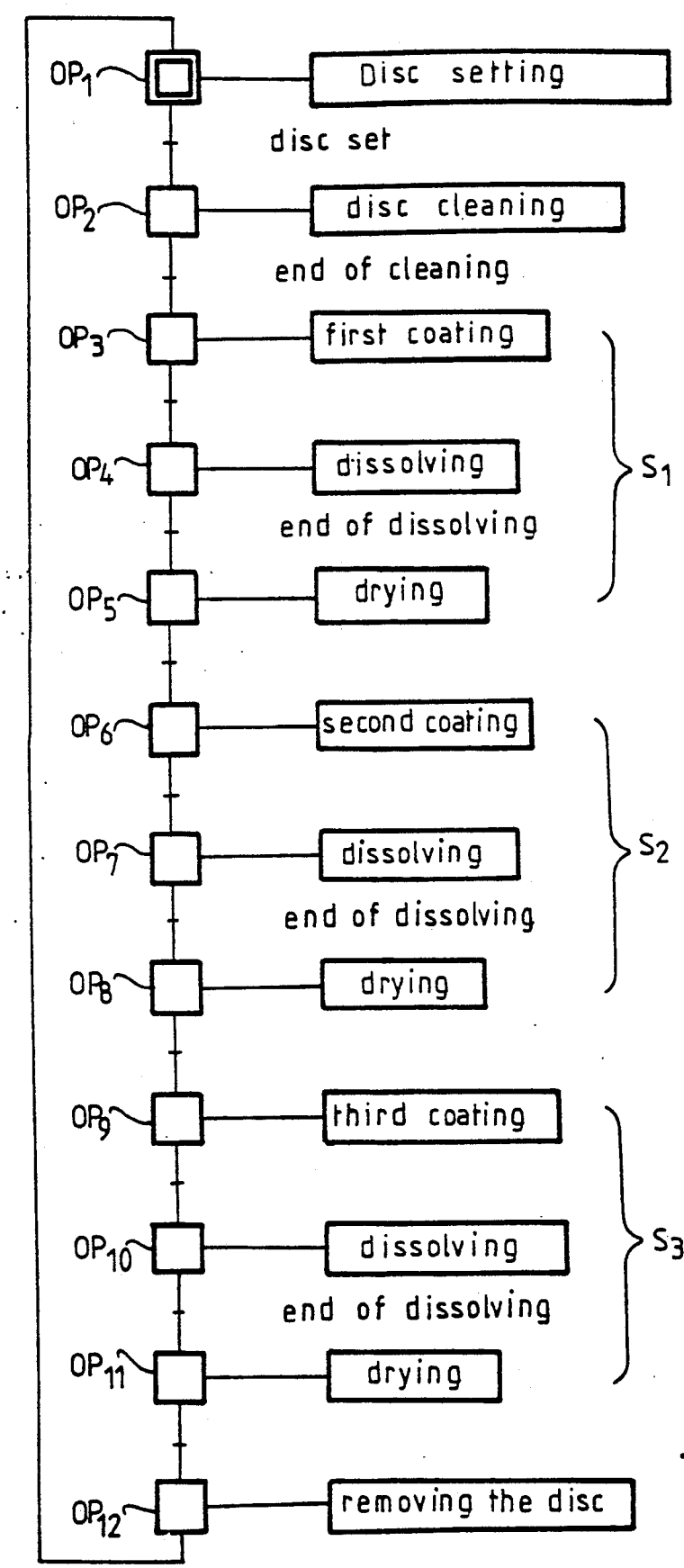
FIG. 4 is a process flow diagram illustrating the sequence of steps in the process of the invention.

FIGS. 3 and 4 illustrate the process of depositing a lubricating layer that permits a read/write head to fly closely over the magnetooptical disk DISC. The various steps in the process according to the invention are shown in FIG. 4 in conjunction with FIG. 1 and are as follows:

FIRST OPERATION $OP_1$: INSTALLING THE DISK

The disk is introduced manually through window F and placed on drive plate PLE and attached thereto by means of the locking screw mentioned above. The disk is then set rotating in a predetermined direction at a speed V on the order of 2000 rpm.

SECOND OPERATION $OP_2$: CLEANING THE DISK

With the disk rotating at approximately 2000 rpm, it is cleaned with a cleaning solution of ethanol or isopropanol. The goal of this cleaning operation is to remove any dust that might be on the disk. The alcohols are miscible with water, making it possible to substantially eliminate any possible traces of humidity that might occur due to storage of the magnetooptical disk in a cold place. A jet of cleaning solution is provided through a dropper, for example, and is directed in the same direction as the tangential velocity of the disk at the point of application of the solution. Thus, the product is spread more effectively than if it were sprayed in the direction opposite to the tangential velocity of the disk. Two or three sprayings of one to two milliliters (1 to $210^{-3}$ $dm^3$) of the cleaning solution are required to ensure proper cleaning of the disk. As soon as the disk is clean, the sequence of operations $S_1$ begins:

THIRD OPERATION $OP_3$: FIRST COATING

This operation uses the lubricant LUBI defined above, contained in an aerosol bomb BOMBI. The lubricant is composed of solid active principles for coating a magnetooptical disk DISC, consisting of polymerizable products dissolved in a mixture of solvents which can be vaporized by the carrier gases. Thus, lubricant LUBI includes a volatile part containing carrier gases and solvents. The carrier gases consist of a complex freon-based mixture:

| | | |
|---|---|---|
| dichlorodifluoromethane | $CCl_2F_2$ | (M = 120) |
| trichlorofluoromethane | $CCl_3F$ | (M = 136) |
| trichloroethane | $C_2H_3Cl_3$ | (M = 132) |
| dichloroethane | $C_2Cl_2$ | (M = 84) |

The role of the carrier gases is to expel from the bomb, the active product dissolved in the solvent or solvents. Thus, it has a mechanical role.

| The solvents consist of a complex mixture containing: | | |
|---|---|---|
| toluene (polar solvent) | $C_7H_8$ | (M = 92) |
| tetrachloroethylene | $C_2Cl_4$ | (M = 164) |
| trichloroethylene | $C_2HCl_3$ | (M = 130) |
| N-butylacetate | $C_6H_{12}O_2$ | (M = 116) |
| ethylbenzene | $C_8H_{10}$ | (M = 106) |

The latter two products can also be used as polymerizable additive elements. In addition to its role as a solvent, this mixture makes it possible to avoid polymerization of the active monomers inside the aerosol bomb BOMBI. It evaporates more or less rapidly in air, permitting polymerization of the active products on the substrate onto which they are deposited (the disk DISC, in this case). The active principles are monomers with the composition $C_xH_yO_z$ with $z<x$ and $z<y$. Before being deposited on the disk, this lubricant must be homogenized and dispersed in the solvent contained in the bomb BOMBI, which is therefore shaken in all directions for a long time.

The disk always rotates at 2000 rpm, so the lubricant is sprayed by aiming the jet of this solution in the direction of rotation at approximately 45 degrees to the plane of the surface of the disk, as shown in FIG. 3b. FIG. 3b shows, in a highly schematic manner, the relative position of the bomb BOMBI to be inclined at an angle $\phi$ of 45° relative to the plane of the surface of disk DISC. Once sprayed onto the disk, lubricant LUBI is distributed over the surface of the disk by centrifugal force. The spraying time is approximately 1 to 2 seconds. In order to cover the entire surface of the disk, the jet produced by the bomb is moved along a radius that runs from the center of the disk to its edge. The useful region of the disk, i.e., the part that allows recording of data, lies between and inner circle CINT of radius $r_{int}$, and an outer circle CEXT of radius $r_{ext}$. This is the region of the disk that is coated with lubricant LUBI. The solvent evaporates on contact with the disk, thereby allowing active monomer molecules to polymerize. These monomers, of the type $C_xH_yO_z$ with $z<x$ and $z<y$, polymerize by addition of CH or $CH_2$ groups that include acetylene or ethylene bonds, respectively, resulting in a paraffin or an aromatic material. Certain polymer molecules become adsorbed to the surface of the disk DISC at places adjacent to points at which carrier gas molecules are also adsorbed to the disk. In addition, other active polymer molecules interact, both with their homologs adsorbed by the silicon oxide surface layer of the disk DISC, and with molecules of the adsorbed carrier gas. This complex combination of different chemical species, interacting in various ways with the surface of layer CPI and with each other, produces an undesireably heterogeneous surface layer. It is necessary then to carry out the following operation $OP_4$ to remedy this.

FOURTH OPERATION $OP_4$: DISSOLUTION

It is therefore advisable to remove both the active molecules not interacting vigorously with the surface of silicon oxide layer CPI and the molecules of carrier gas adsorbed by this same layer CPI. For this purpose, several seconds after coating with the lubricant LUBI, a solvent SOLVI is sprayed on the disk, using a dropper, for example. This spraying is also performed at approximately 45 degrees to the plane of the surface of the disk in the same way as the lubricant LUBI was applied. The solvent SOLVI which permits the most effective dissolution, and produces the result mentioned above, is trichlorethylene. Two or three bursts of this solvent, in quantities of 2 to 3 milliliters each, are necessary. Trichlorethylene was chosen as the solvent because the energy of dissolution of the excess active product molecules and the carrier gas molecules in trichlorethylene is greater than the energies of interaction between the active product molecules and the solvent molecules. This energy of dissolution is also greater than the solvent-to-substrate adsorption energy, but is less than the active product molecule-to-substrate adsorption energy. Consequently, excess product molecules and excess carrier gas molecules are effectively removed from the surface of the disk. After operation $OP_4$ is completed, operation $OP_5$ takes place.

FIFTH OPERATION $OP_5$: DRYING (OR WIPING) OPERATION

After the dissolution operation, removal of excess product from the surface of layer CPI is not complete. Small patches with diameters of less than 10 microns generally remain, and radial tracks appear here and there. To eliminate these incipient crystallites and radial tracks, there are two possible techniques:

a) First technique: A wiping operation is performed using, for example, a large sheet of "Kimwipes" (disposable tissue) folded into a rectangle about 3 centimeters wide. One edge of this sheet is marked by a fold to provide the rigidity that allows it to be picked up by hand. The other edge is kept curved and is covered with a Whatman optical tissue (these tissues are used for cleaning optical glass). This assembly, including of the sheet of Kimwipes and the Whatman optical tissue, is then sprayed with solvent and applied all along the radius of the disk. This familiar wiping process makes it possible to get rid of solids which are not interacting vigorously with the surface, without microscopically disturbing the films of lubricant already strongly adsorbed by the surface.

b) Second technique: An operation, preferable for industrial use, includes performing an operation called drying or wiping. This operation is performed by spraying a gas from a gun at a pressure of 5 bars, this gas being, for example, type U nitrogen, with the spraying taking place under conditions identical to those described above where the disk was coated with lubricant, i.e., at an angle $\phi$ of 45° relative to the disk, in its direction of rotation, and at a speed of rotation of 2000 rpm. Drying with gas under pressure totally eliminates the solvent, as well as any minor accumulations of polymer, without leaving any radial tracks or scratching. The duration of this drying operation by spraying gas is approximately 60 seconds.

Figure 5:
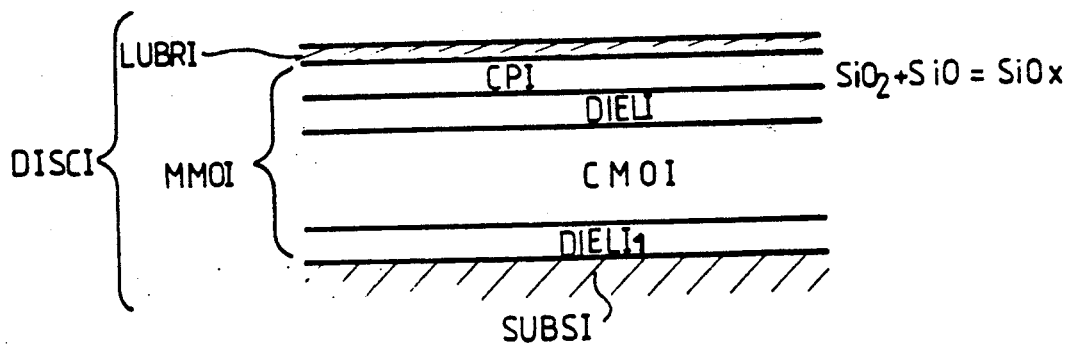
FIG. 5 is a side view showing the magnetooptical disk produced by the process according to the invention, including a lubricating layer that allows a read/write head to fly over the disk's surface.

It has been observed experimentally that to deposit a completely homogeneous layer LUBRI of lubricant LUBI on the surface of disk DISC for permitting correct flight of a read/write head relative to the disk for a sufficiently long time (several hundreds of hours) it was necessary to carry out at least three sequences of operations $S_1$, $S_2$, $S_3$ identical to sequence $S_1$. Sequence $S_2$ therefore consists of operations $OP_6$, $OP_7$, and $OP_8$, while sequence $S_3$ consists of operations $OP_9$, $OP_{10}$, and $OP_{11}$. When operation $OP_{11}$ is complete, operation $OP_{12}$ follows, consisting of removing the disk DISC coated with the layer LUBRI of lubricant LUBI, together referred to as the coated disk DISCI. This disk, shown in FIG. 5, includes the substrate SUBSI, the magnetooptical medium MMOI formed by the first dielectric layer $DIELI_1$, the magnetooptical layer CMOI, the second dielectric layer $DIELI_2$, and the protective layer CPI that consists of silicon oxide, and the lubricating layer LUBRI.

Figure 6:
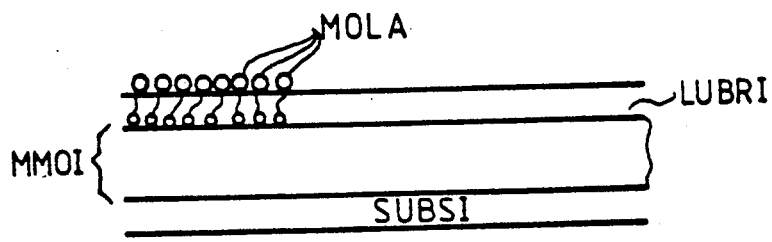
FIG. 6 is a side view illustrating how the lubricating layer is formed from a two-dimensional monomolecular layer to create a cushion of air on the surface of the disk.

Referring to FIG. 6, the lubricating layer LUBRI includes a two-dimensional monomolecular layer, i.e., a quasi-planar layer, of a thickness on the order of several thousandths of a micron, and in any case, less than one hundredth of a micron. This monomolecular layer consists of a plurality of long-chain molecules each with a polar and a non-polar ending, where there is a high probability that the polar ending has a non-zero electrical moment. The free non-polar ends of these molecules form a sort of short-nap carpet, which explains the lubricating properties of these monomolecular layers; the free ends allow the air molecules MOLA to be engaged by the monomolecular layer, thereby promoting the existence of an air cushion that allows a read/write head to fly close relative to the disk.

In fact, the layer LUBRI consists of a continuous layer of oxyhydrocarbon polymers of very limited thickness (see above), which is transparent to light. As shown above, the number of coatings required to produce a continuous layer is limited: following each coating, the residual discontinuity of the layer thereby produced can be eliminated because the mixture of solvents is characterized by an interaction energy between the molecules and the treated surface layer (DIELI$_2$) which is considerably less than the interaction energy between the polymer layers and the treated surface.

The polymer layer is essentially a two-dimensional hydrocarbon sheet that interacts with the surface of the disk via a limited number of carbonyl groups C=O. Adsorption to the surface of the disk DISC (DIELI$_2$) is accomplished via the non-bonding electron pairs of these carbonyl groups. Such a continuous layer, fixed at discrete points to the rotating disk, serves very well to entrain a layer of air moving at effectively zero velocity with respect to the surface of the disk. This entrained layer of air, called the "fixed Prandle layer", allows the read heads to fly. A large number of monomers, or a mixture of monomers of the type mentioned above that leads to the formation of a polymer layer of this type, will permit the read/write heads to fly above a magnetooptical disk similar to the disk DISC herein described.

It has been determined experimentally that, after allowing a read/write head to fly for several hundred hours relative to a magnetooptical disk DISCI, wherein the magnetooptical layer was made of iron-terbium-gadolinium and cobalt, the dielectric layers were made of aluminum nitride, and the protective layer was made of silicon oxide, and the disk was coated with a lubricating layer LUBRI deposited by the process according to the invention, the disk had no scratches. This means that the flight of the read/write head takes place in a completely satisfactory manner relative to such a disk lubricated by a layer deposited according to the invention. Similar observations have been made with magnetooptical disks whose magnetooptical layer was made either of iron-terbium or iron-gadolinium, or iron-terbium-gadolinium, with the dielectric layers being made of alumina, the protective layer being made of silicon oxide, and the disks having been coated with a lubricating layer (LUBRI) by the process according to the invention. Thus, several dozen hours of flying by the read/write heads relative to such a disk have been attained by read/write heads of the so-called "takeoff" type; several thousand, even tens of thousands of takeoffs have been made.

In addition, other disks DISCI coated with a lubricating layer deposited according to the process of the invention have been subjected successively for several hours to alternating dry and wet atmospheres. These read/write heads were then caused to fly relative to these disks for several hours without there being any scratching of the surfaces of the disks.

Thus, a first disk, subjected to three sequences $S_1$, $S_2$, $S_3$ of successive coating, the solvent used being trichloroethylene, was exposed for 7 months to room temperature and subjected for 1 hour and 45 minutes to the flying of a read/write head, without any damage to the surface of the disk. A second disk was subjected to three coatings with lubricant LUBI with trichloroethylene as the solvent, and was exposed to a temperature of 20° C. for three days, to a dry atmosphere at a temperature of 60° for two days, to −4° C. for one day, to 20°/22° C. for 75 days, and to 20° for 57 days, and was then subjected to the flying test with a read/write head for 3 hours and 50 minutes without sustaining any damage.

A third disk subjected to three successive coatings using trichloroethylene as the solvent and dried with nitrogen was subjected successively to 13 days in a dry atmosphere at 60° and then to eight days in a wet atmosphere, then to a dry atmosphere at 60°, and then subjected to a flying test with a read/write head for 2 hours and 35 minutes, wherein the disk was stopped and started 50 times without sustaining any damage during the flight.

In addition, a fourth disk which likewise had been subjected to three coatings with trichloroethylene as the solvent and with the drying operation performed with nitrogen, was placed in a heat chamber for 12 hours and successively exposed to temperatures of 125° for 10 minutes, −55° for 10 minutes, and again to 125° for 10 minutes, then to a dry atmosphere, then to room temperature for 4 days, then to a dry atmosphere at 60° for three days, then to a wet atmosphere at 60° for four days, then to a wet atmosphere for eight days, then to a dry atmosphere at 60° and was then subjected to a flying test for 3 hours and 25 minutes with 50 stops and starts, without experiencing any damage.

In conclusion, the process according to the invention permits deposition of a lubricating layer using a lubricant LUBI, and is particularly effective in assisting the flight of a read/write head relative to the surface of this disk.

Other modifications and implementations will occur to those skilled in the art without departing from the spirit and scope of the invention as claimed. Accordingly, the above description is not intended to limit the invention except as indicated in the following claims.

What is claimed is:

1. A process for depositing, on the surface of a magnetic disk, a layer that permits the flight of a read/write head relative to the surface of the layer, the magnetic disk including a substrate upon which a magnetic recording layer is deposited, itself coated with a silicon oxide protective layer to protect against impact and corrosion, the process comprising the steps of:

cleaning the disk to remove dust;

setting the disk into a state of rotation;

spraying the disk at a location, and in the same general direction as the tangential velocity of the disk at that location, with a lubricant containing a volatile part including carrier gases, solvents, and active oxyhydrocarbon monomeric elements, said elements being subsequently polymerized by the evaporation of said solvents and adsorbed to said protective layer;

spraying the disk at a location, and in the same general direction as the tangential velocity of the disk at that location, with a solvent to remove any active oxyhydrocarbon monomeric elements that are not interacting with the protective layer, and to remove any molecules of said carrier gases that may have adsorbed to said protective layer;

wiping the disk to remove any crystallites of excess polymer on the disk; and coating the disk with a continuous monomolecular homogeneous two-dimensional layer of hydrocarbon molecules adsorbed to the protective layer.

2. The process of claim 1 wherein the active monomeric elements are of the $C_xH_yO_z$ type, where $z<x$ and $z<y$, and said elements are polymerized by an addition of CH or $CH_2$ groups that include acetylene or ethylene bonds, respectively, resulting in a paraffin or an aromatic material.

3. The process of claim 1 wherein said carrier gases comprise:
dichlorodifluoromethane, trichlorofluoromethane, trichloroethane, and dichloroethane.

4. The process of claim 1 wherein said solvents comprise:
toluene, tetrachloroethylene, trichloroethylene, N-butylacetate, and ethylbenzene.

5. The process of claim 1 wherein the step of spraying the disk with a lubricant is performed at an angle of incidence of approximately 45° relative to the plane of the disk.

6. The process of claim 1 wherein the solvent used to remove any active oxyhydrocarbon monomeric elements that are not interacting with the protective layer is trichlorethylene.

7. The process of claim 1 wherein the step of wiping the disk includes the step of spraying the disk with nitrogen, said nitrogen being under pressure and being applied at an angle of incidence of approximately 45° relative to the plane of the disk.

* * * * *